June 10, 1924.
H. P. HALL
CARRIAGE FOR SELF ACTING MULES
Filed Feb. 22, 1921    13 Sheets-Sheet 1
1,497,270
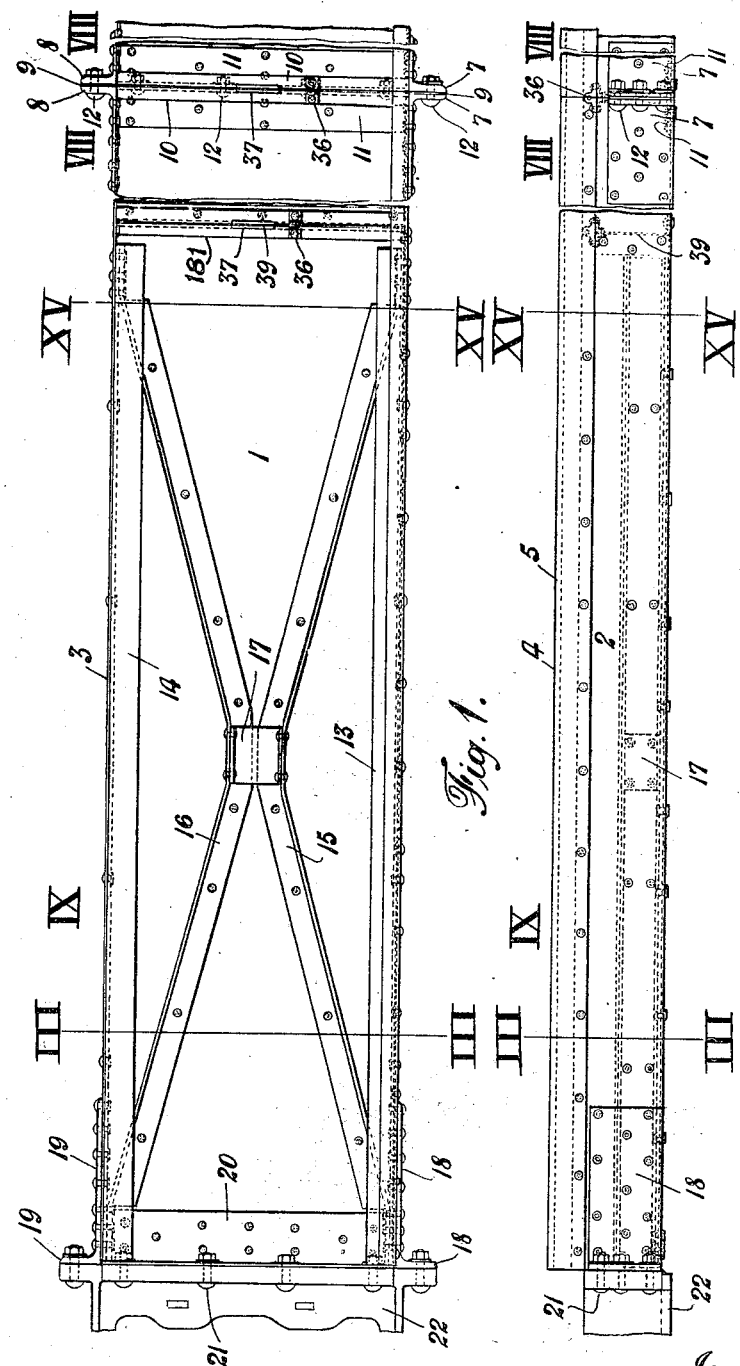
Inventor:-
Henry Platt Hall
By his Attorneys:-

June 10, 1924.

H. P. HALL 1,497,270

CARRIAGE FOR SELF ACTING MULES

Filed Feb. 22, 1921  13 Sheets-Sheet 2

Inventor:-
Henry Platt Hall

By his Attorneys:-

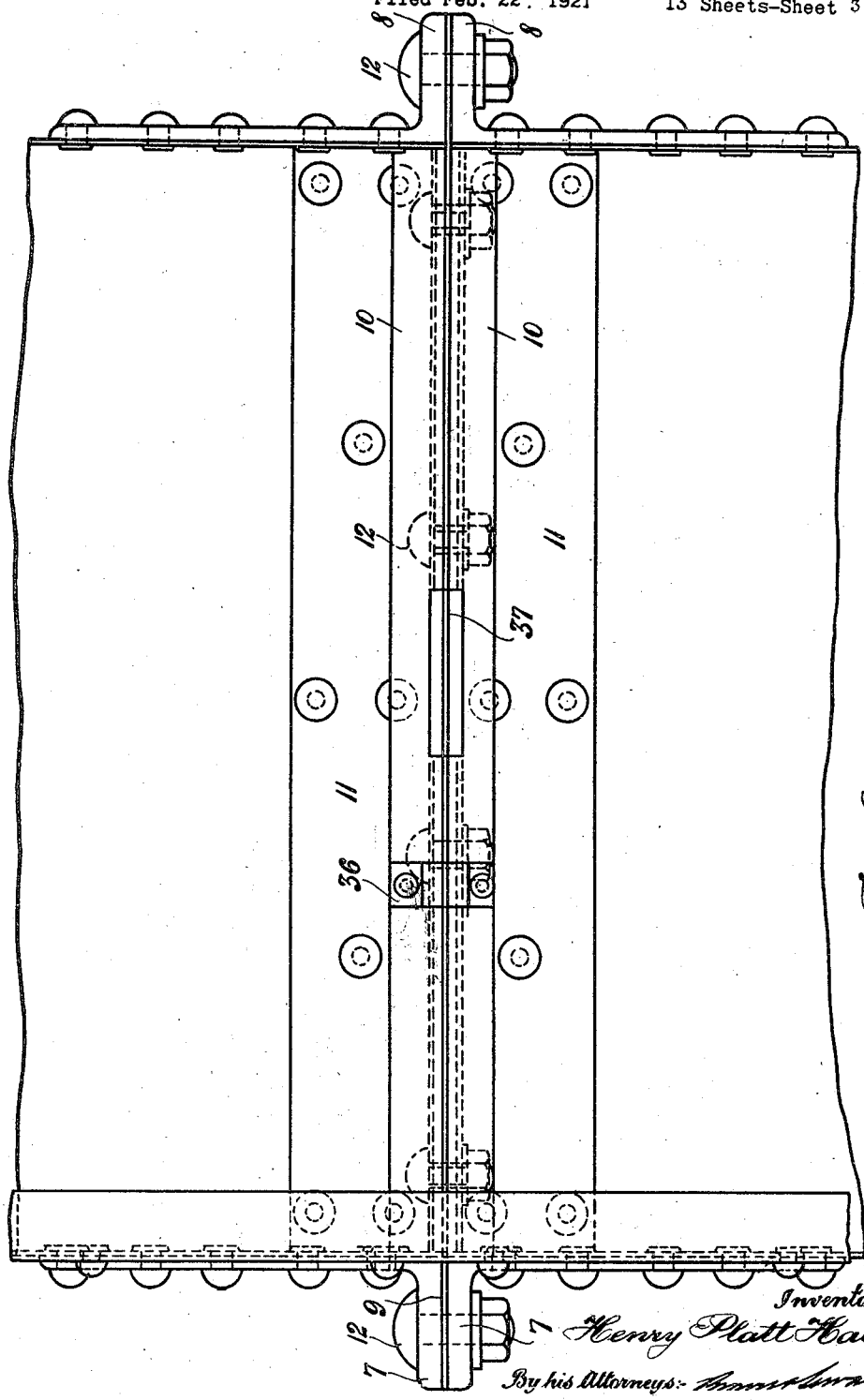

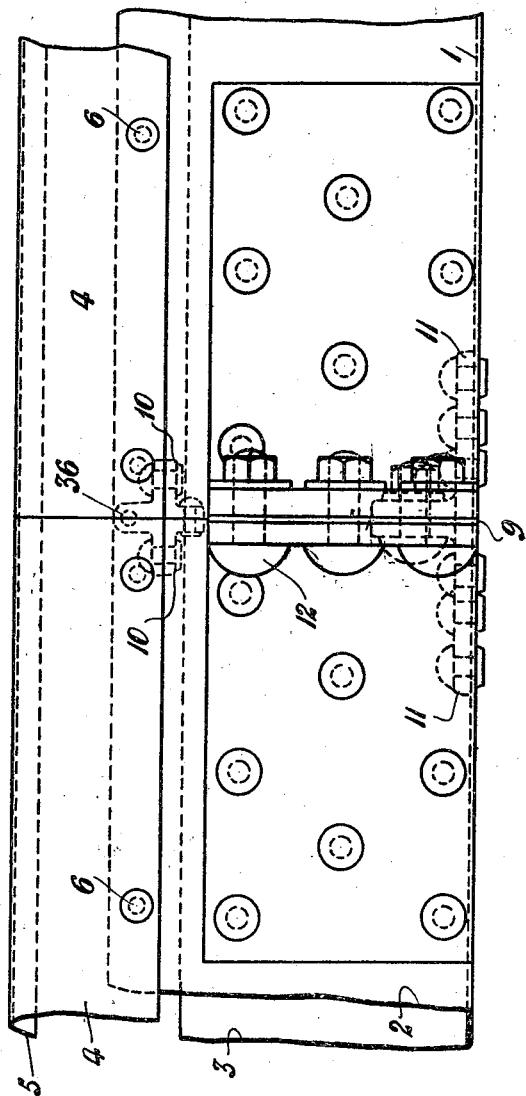

June 10, 1924.

H. P. HALL 1,497,270

CARRIAGE FOR SELF ACTING MULES

Filed Feb. 22, 1921

Inventor:-
Henry Platt Hall
By his Attorneys:-

June 10, 1924.
H. P. HALL
1,497,270
CARRIAGE FOR SELF ACTING MULES
Filed Feb. 22, 1921      13 Sheets-Sheet 6
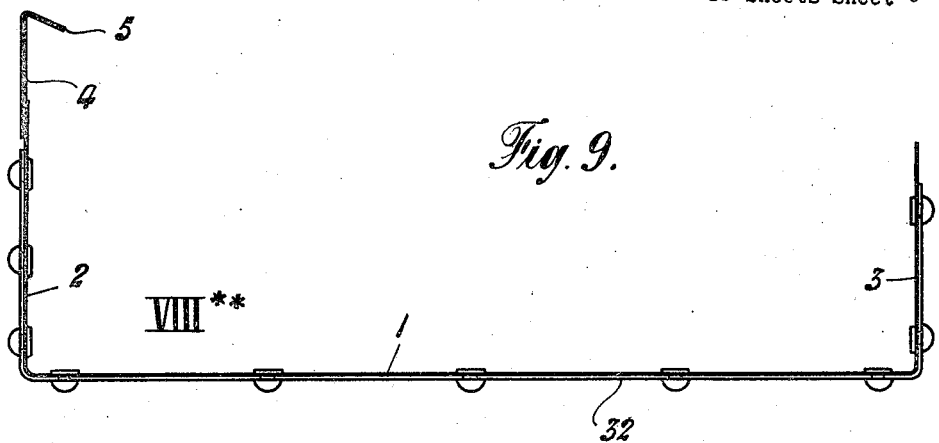
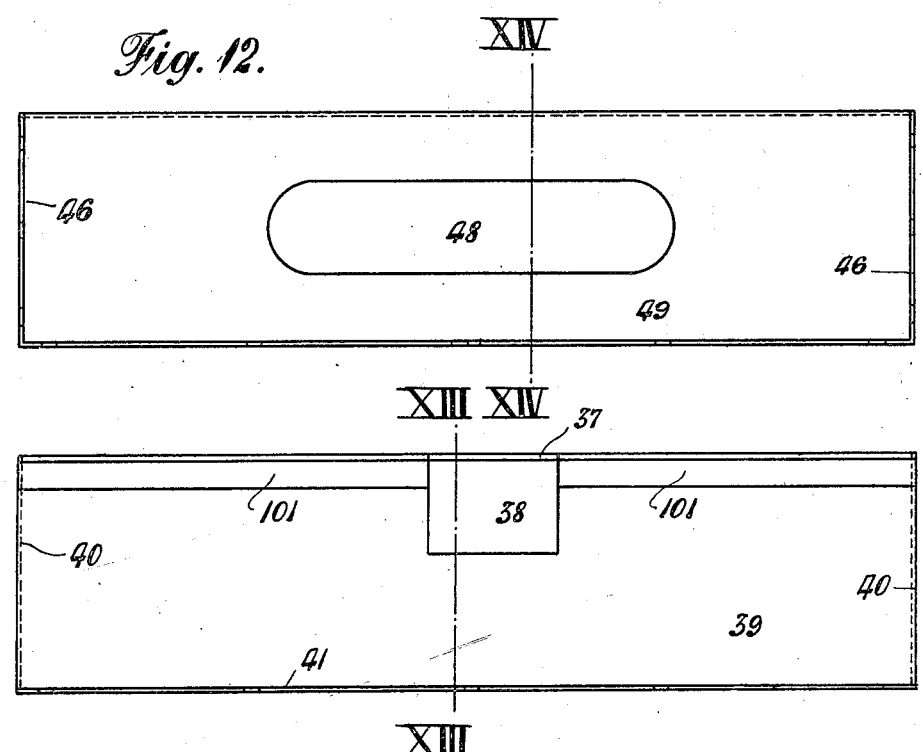
Inventor:-
Henry Platt Hall
By his Attorneys:-

June 10, 1924.  1,497,270
H. P. HALL
CARRIAGE FOR SELF ACTING MULES
Filed Feb. 22, 1921  13 Sheets-Sheet 7

Inventor:-
Henry Platt Hall
By his Attorneys:-

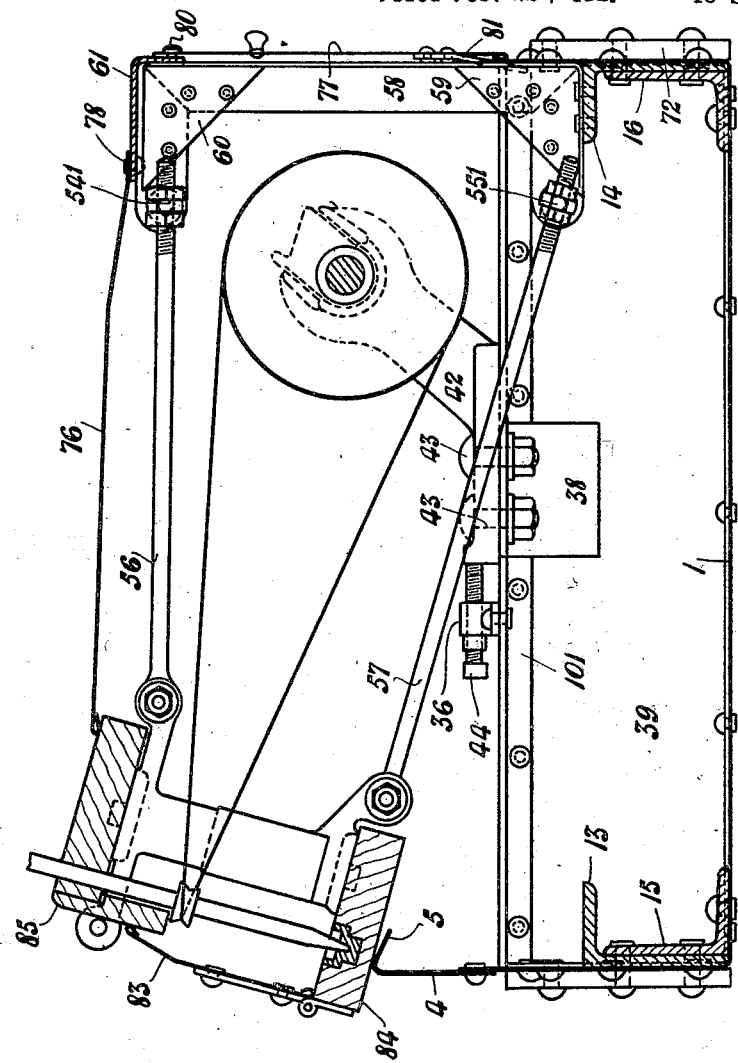
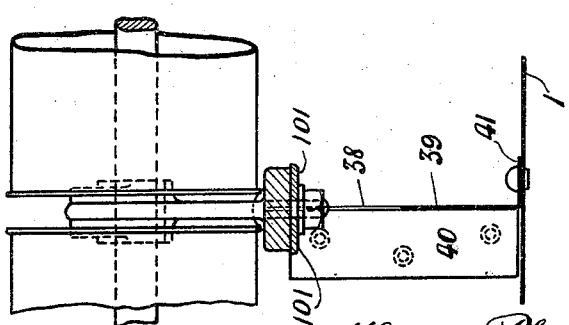

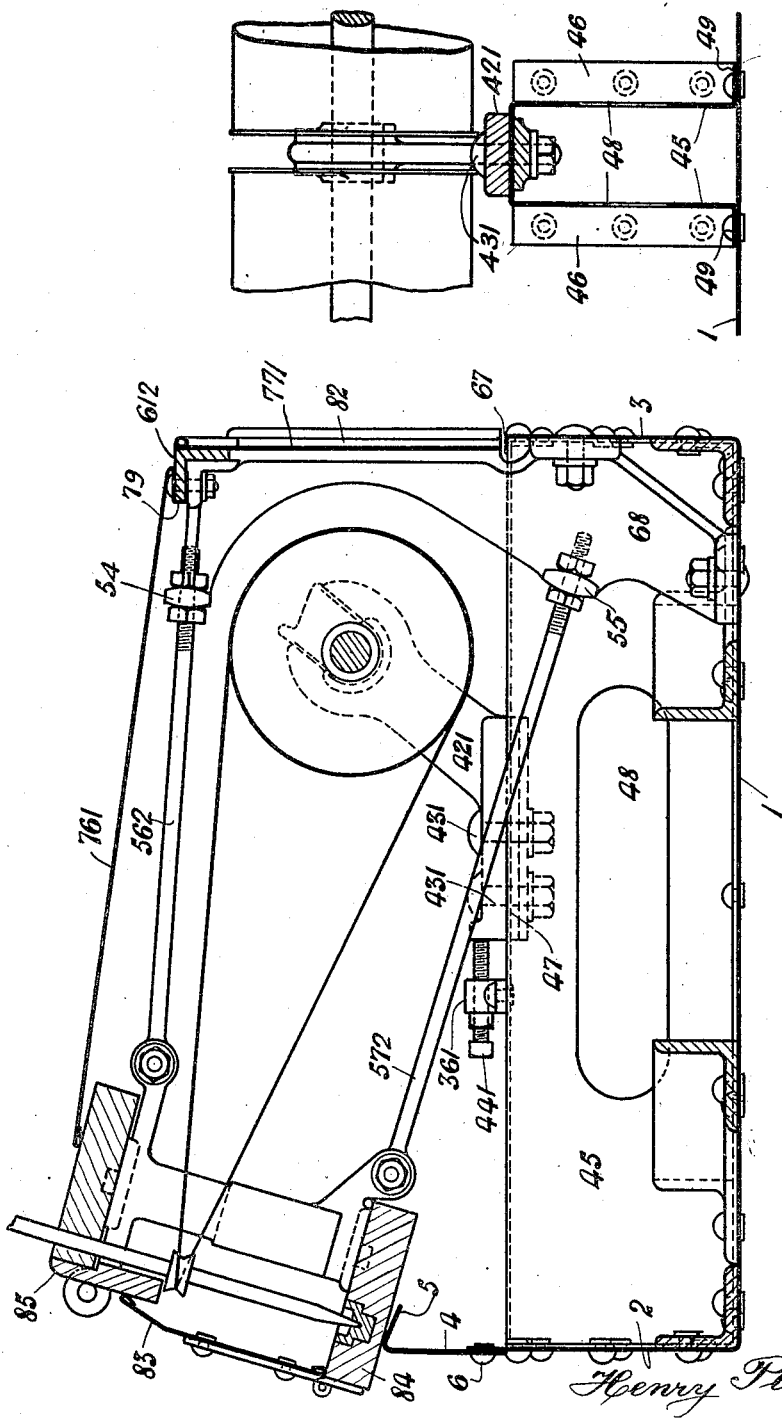

June 10, 1924.  
H. P. HALL  
CARRIAGE FOR SELF ACTING MULES  
Filed Feb. 22, 1921

Inventor:-
Henry Platt Hall
By his Attorneys:-

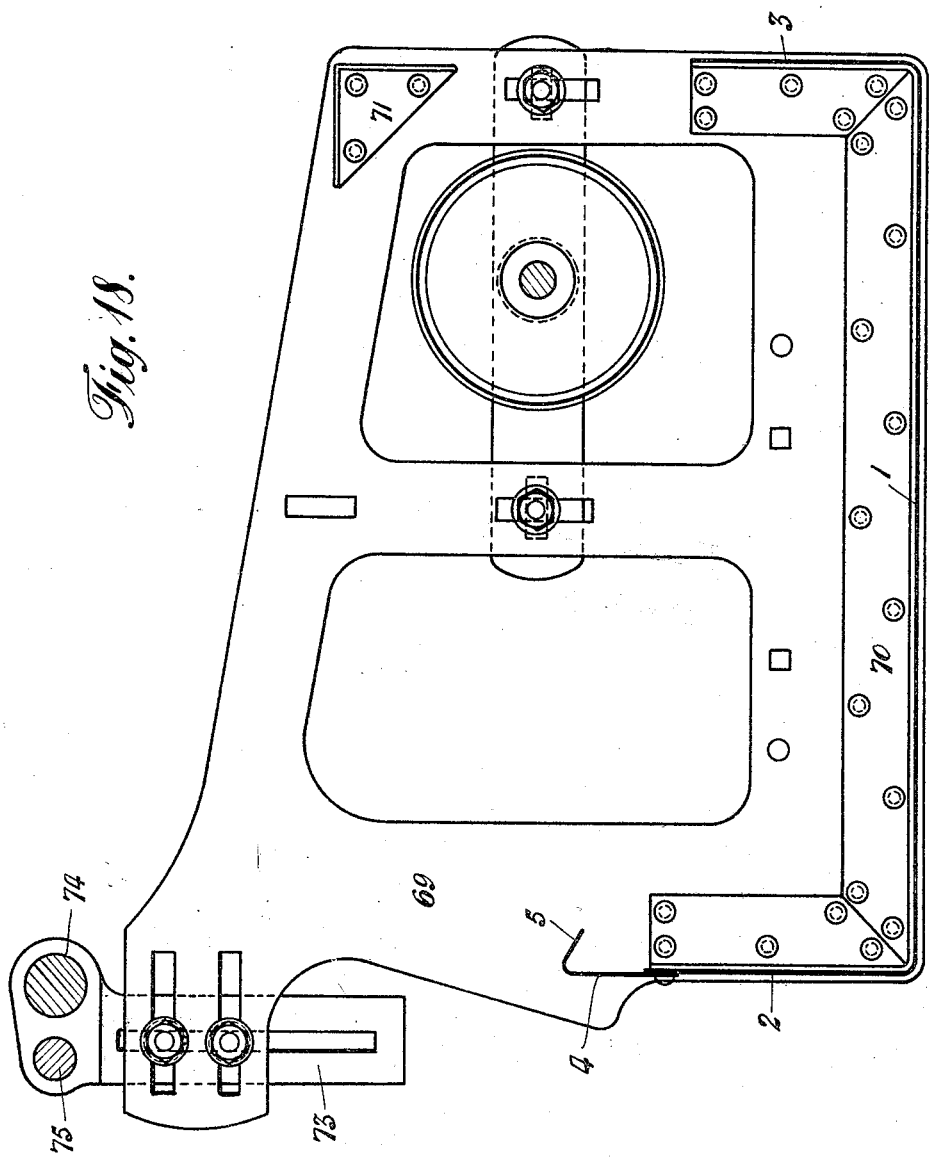

June 10, 1924.

H. P. HALL 1,497,270

CARRIAGE FOR SELF ACTING MULES

Filed Feb. 22, 1921　　13 Sheets-Sheet 12

Inventor
Henry Platt Hall
By his Attorneys:

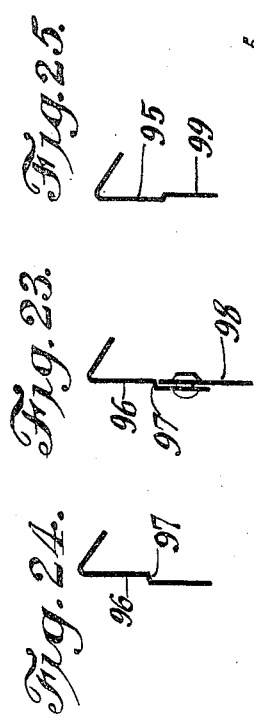
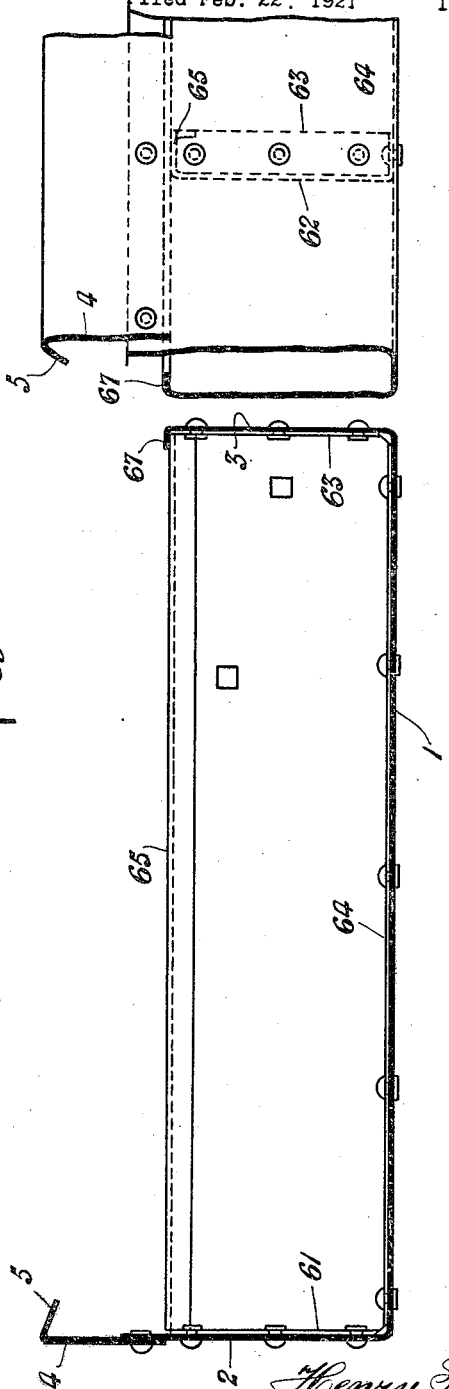

Patented June 10, 1924.

1,497,270

UNITED STATES PATENT OFFICE.

HENRY PLATT HALL, OF OLDHAM, ENGLAND.

CARRIAGE FOR SELF-ACTING MULES.

Application filed February 22, 1921. Serial No. 446,987.

*To all whom it may concern:*

Be it known that I, HENRY PLATT HALL, a subject of the King of the United Kingdom of Great Britain and Ireland, and resident of "Toravon" Werneth, Oldham, in the county of Lancaster, England, have invented new and useful Improvements in Carriages for Self-Acting Mules, of which the following is a specification.

This invention consists in carriages for self acting mules and in devices and constructions to be applied in them which in comparison with the carriages heretofore formed wholly or in great part of metal and with body sections formed of steel or other plate built up from pieces secured together or bent into shape and with flanges for stiffening them or affording support for brackets to carry spindles, afford the advantages that the formation of carriages made wholly or in great part of steel or other metal plate or sheet and of the various lengths requisite is made more practicable that change of spindles for others of different length or change of the position of spindles is facilitated and the necessary strength, rigidity and capacity to withstand the strains and shocks of use are obtained more fully in proportion to the weight of the carriages and the carriages are better altogether.

For the attainment of these advantages, the invention, relating to carriages constructed in sections formed of metal sheet bent into channel shape presenting a bottom and front and back walls, consists in devices and constructions to be applied in such carriages which are hereinafter to be described and particularized in the claims.

In the accompanying drawings Figs. 1 and 2 are respectively a plan and a front elevation of portions of the carriage of a self acting mule, illustrating a carriage of one construction and Fig. 3 is a transverse section taken on the plane indicated by the line III—III of Figs. 1 and 2. Fig. 4 is a plan and Fig. 5 a front view of a portion of the carriage for a self acting mule illustrating one method of connecting sections of the carriage together.

Fig. 9 is a transverse section through a part of a carriage for a self acting mule illustrating a method of connecting adjacent sections.

Figs. 11 and 12 are side elevations of supports for tin roller bearing brackets. Figs. 13 and 14 are vertical sections taken on planes indicated respectively by the lines XIII—XIII and XIV—XIV of Figs. 11 and 12 respectively which however show fewer parts than Figs. 13 and 14.

Fig. 15 is a transverse section through part of the carriage of a self acting mule taken on the plane corresponding to that indicated by the line XV—XV of Figs. 1 and 2 but through a carriage at the other side of the headstock showing the application of the support shown in Figs. 11 and 13 and also a second form of mounting for the tie rods of the spindle rails or spindle boxes.

Figures 6, 7:
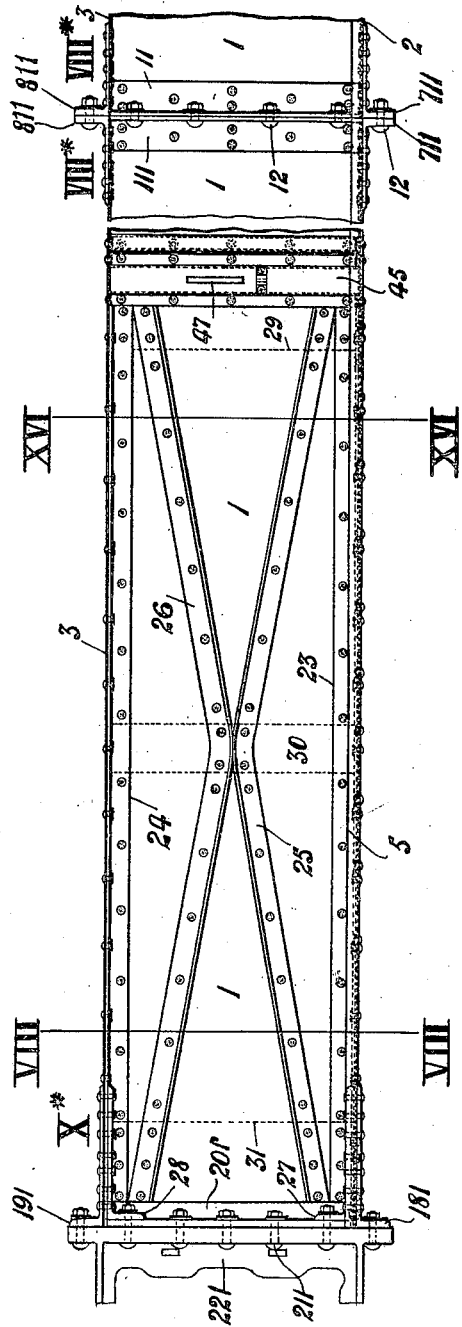
Figs. 6 and 7 are respectively a plan and a front elevation of portions of the carriage of a self acting mule, illustrating a carriage of another construction

Fig. 16 is a transverse section through part of the carriage of a self acting mule taken on the plane corresponding to that indicated by the line XVI—XVI of Figs. 6 and 7 but through a carriage at the other side of the headstock showing the application of the support shown in Figs. 12 and 14 and also a third form of mounting for the tie rods of the spindle rails or spindle boxes.

Figure 17:
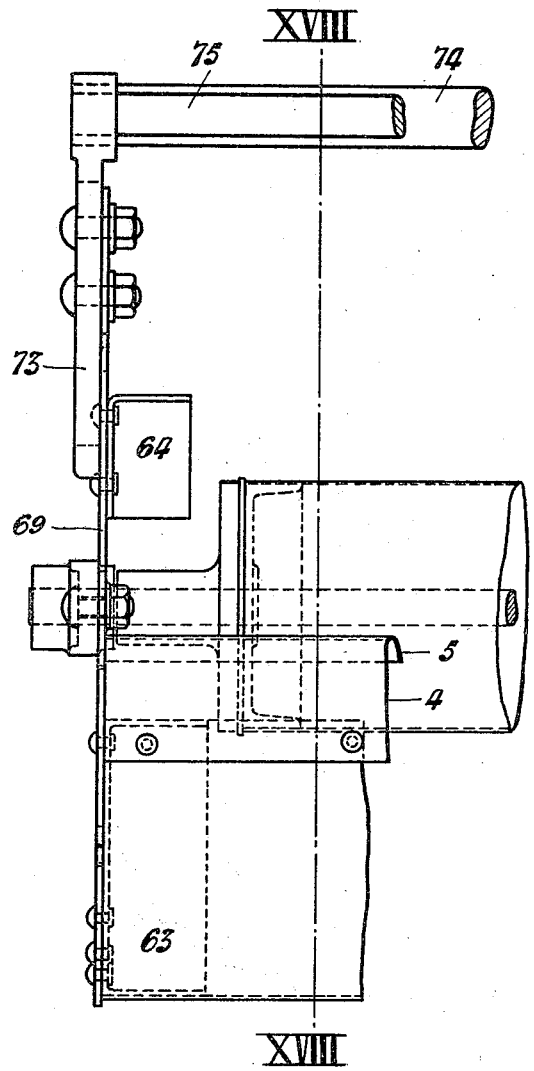

Fig. 17 is a front elevation of part of the carriage for a self acting mule and Fig. 18 is a section taken on the plane indicated by the line XVIII—XVIII of Fig. 17 illustrating the method of connecting the end plates to the carriage and showing also some other parts. Figs. 19, 20, 21, and 22 are respectively a transverse section, a longitudinal section, a transverse section and a front elevation of parts of a carriage illustrating another way of mounting brackets for tie rods for spindle rails or spindle boxes. Fig. 23 is a section illustrating a jogged spindle rail rest riveted to the front wall of a section of a carriage and Figs. 24 and 25 are sections illustrating jogged spindle rail rests.

The same numerals of reference are employed to indicate corresponding parts in all the figures.

A carriage for a self acting mule of the construction to which this invention is applied is constructed of a suitable number of sections of suitable, and advantageously equal, length connected one to another after formation to build up a carriage of the length requisite. Each section is formed of a plate of steel or other metal bent into channel shape with a bottom 1 and front and back walls 2, 3 much as in the formation of similar sections heretofore formed or proposed to be formed in order to be applied in the construction of mule carriages, but in the case illustrated instead of the front 2 being bent, in the manner heretofore followed or proposed in the formation of sections of carriages for self acting mules, with an inwardly or rearwardly directed inclined flange to form a rest for the spindle rail or spindle box of the self acting mule, a plate or sheet 4 comprising a vertical part and a rearwardly directed inclined flange 5 is secured to it according to the invention forming the subject of my co-pending application Serial No. 446984 by rivets 6 so that the vertical part extends on the front wall 2 and upwardly therefrom and presents the rearwardly directed flange at an appropriate height above the place of attachment of the plate 4 to the front wall 2 and the flange 5 will serve for the support of the spindle rail or spindle box of the self acting mule, and by plates 4 of different heights being provided for use, an inclined flange 5 may be provided at any height requisite in a section and it is made easy to take away one plate by the cutting or removal of rivets and to rivet another in its place, if after a carriage has been constructed it is necessary or desirable to provide a flange 5 at a different height for spindles of different length or for change of the position of the spindles.

The back 3 of a section may be provided at the top with a forwardly bent flange 67 as shown in Figs. 19, 20, 21 and 22 to stiffen the back and to form a support on which other parts for example back covers may be made to rest or to bear.

The plates 4 are shown as presenting plane front surfaces but, if desirable in any case, for the sake of greater stiffness in the plates 4 and consequent stiffening to the carriage front or for any other reason, the plates 4 may be jogged to present on each face parts in two approximately parallel planes so that the upper parts will be brought further towards the front or further towards the rear than in the case shown in the drawings. In Figs. 23, 24 and 25 illustrative examples of jogging are shown. Fig. 24 shows a spindle rail rest 96 jogged at 97 so that each face presents parts in two parallel planes and the upper part is further to the rear than the lower and Fig. 23 shows such a spindle rail rest 96 riveted to the front wall of a mule carriage section 98. Fig. 25 shows a spindle rail rest 95 jogged at 99 so that each face presents parts in two parallel planes and the upper part further forward than the lower.

For coupling one section VIII to another to adjoin it each is provided in one construction according to the invention forming the subject of my co-pending application Serial No. 446985 and shown in Figs. 1, 2, 4 and 5 at each or one end, preferably externally as shown, with flanged brackets 7, 8, riveted to it at the front and rear respectively to present their flanges opposite to those of the brackets on the section to be joined to it and a steel plate 9 to extend from front to rear between the meeting edges of each section VIII to be joined is provided. Angle bars 10 to extend across the sections between the inner surfaces of the front and back walls, 2, 3 are riveted on the opposite sides of the plate 9 near its upper edge. Other angle bars 11 to extend across the sections between the inner surfaces of the front and rear walls 2, 3 are made to embrace the plate 9 near its lower edge and to bear and be riveted upon the upper side of the bottoms 1 of the sections.

At its bottom and ends the plate 9 is made to correspond in shape with the outline presented by the bottoms 1 of the sections VIII and the outer edges of the flanged brackets 7, 8. Bolts 12 are passed through brackets 7, 8 and angle bars 11 riveted to the sections to be joined together and through the plate made to extend between them and are provided with nuts. The bolts 12 the interposed plate 9 and the riveting of the brackets 7, 8 on the front and rear end of the lower angle bars 11 to the bottoms of the sections VIII suffice to secure the sections VIII firmly together and to give them the rigidity requisite at the ends joined together when the nuts upon the bolts 12 are tightened.

In Figs. 1 and 2 the lower parts of the fronts 2, the backs 3 and the bottoms 1 of the two sections VIII to be joined together are cut away to allow space for the plate 9 to be applied between the ends of the sections VIII while the upper parts of the fronts 2 are made to meet one another. The present invention consists in an important respect in the construction of the sections to be secured to the square of the headstock of a self acting mule and affording the great rigidity requisite in such sections and not hitherto attained in mule carriages mainly or wholly of metal. In one construction with this object each of the sections IX of the carriage to be secured to the square of the headstock of a self acting mule, one of which sections IX is shown by Figs. 1, 2, and 3, being formed of a trough, shell or body of bent plate or sheet metal with a part 4 with a rearwardly inclined flange 5 riveted to the front like that hereinbefore described, is provided in the construction illustrated in Figs. 1, 2 and 3 within the cavity of the bent plate or sheet forming the bottom 1 and front and back walls 2, 3, with longitudinal angle bars 13, 14 extending along the front and rear walls 2, 3 respectively and with bent angle bars 15, 16 each extending from near the centre to near or towards the corners at the front or rear of one end of the section and towards the corners at the front or rear of the other end as the case may be and each riveted to one of the longitudinal angle bars 13, 14, to the bottom 1 of the section IX and to a channel bar 17 in the centre. Brackets 18, 19 secured preferably on the outward sides of the front and rear walls 2, 3 and an angle bar 20 secured by rivets to the inner face of the bottom 1 of the bent plate or sheet at one end are provided in order to be bolted by bolts 21 to the square 22 so as to secure the section IX firmly thereto. The plate or sheet forming the bottom 1, the front 2 and back 3 of the several angle bars 13, 14, 15, 16 and brackets 18, 19 are riveted together at places where they touch or overlap, the lower flanges of the angle bars 15, 16 being cut away at the ends so that the vertical flanges at those parts may be riveted against the front 2 and back 3 of the section IX, the brackets 18, 19 and angle bar 20 are made to extend and riveted over a larger area of the front 2, back 3 and bottom 1 of the section IX than the brackets 7, 8 and angle bars 11 secured to such section IX at the other end where it forms one of the two sections VIII to be joined together. In the construction illustrated in Figs. 6, 7, and 8 for coupling one section VIII* to another to adjoin it each section is provided externally on the front 2, back 3 and on the upper face of the bottom 1 respectively with brackets 711, 811, and angle bars III similar to and used with bolts 121 like those shown in Figs. 1, 2, 4 and 5 but the plate 9 and angle bars 10 riveted to it are omitted and the bottom 1, fronts 2 and backs 3 of the adjoining sections VIII* are made to abut against one another throughout their ends.

Figure 5:
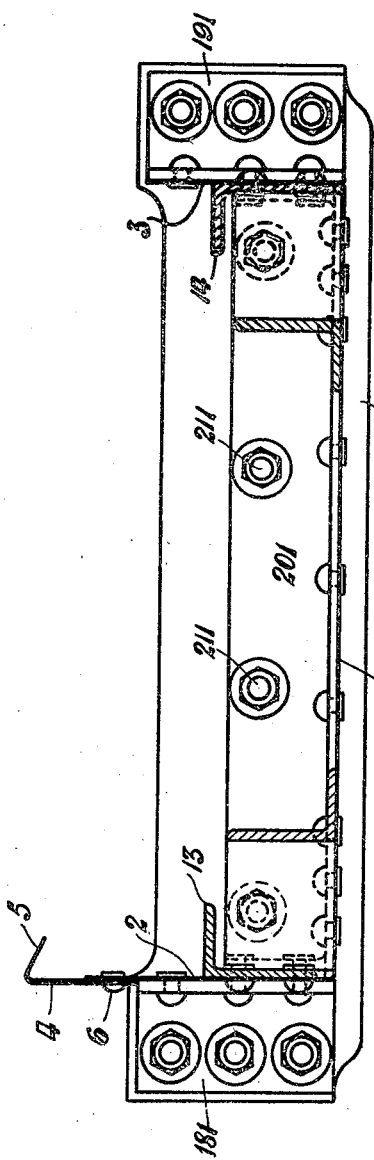
Figure 8:
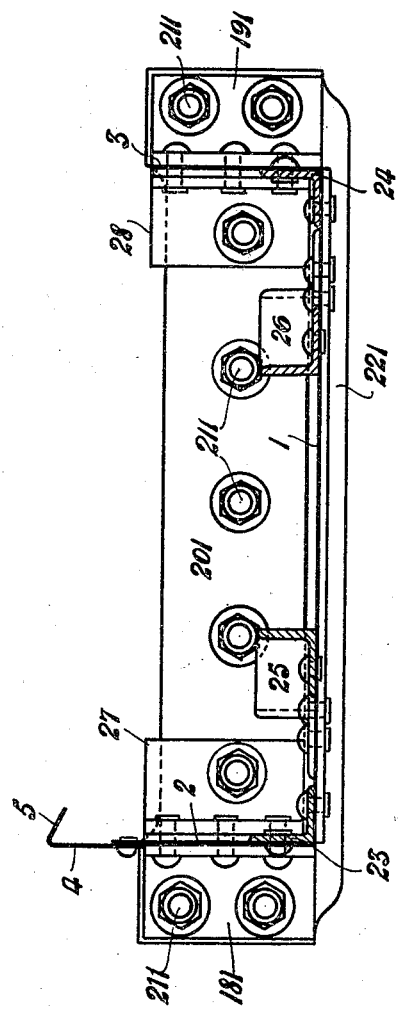
Fig. 8 is a transverse section taken on the plane indicated by the line VIII—VIII of Figs. 6 and 7.

Further in the construction illustrated in Figs. 6, 7 and 8 each of the sections X*, one being shown, which are to be secured to the square 221 of the headstock of a self acting mule being like that shown in Figs. 1, 2 and 3, formed of a trough, shell or body of bent plate or sheet metal with a part 4 with a rearwardly inclined flange 5 riveted to the front, is provided within the cavity formed by the front 2, bottom 1 and back 3 of the bent plate or sheet with longitudinal angle bars 23, 24 extending along the junctions of the front 2 and back 3 with the bottom 1 and riveted respectively to the front 2 and bottom 1 and to the back 3 and bottom 1 and is also provided with bent angle bars 25, 26 extending on the bottom 1 from near the centre to near the front and rear corners at one end of the section and near or towards the corners at the other end of the section and riveted to the bottom 1. At the end of the section X* to be secured to the square 221, brackets 181, 191 and an angle bar 201 similar and used with bolts 211 similarly to those shown in Figs. 1, 2 and 3 are applied. The lower flanges of the longitudinal angle bars 23, 24 are cut away at the ends presented towards the square 221 so that the upper flanges may extend over the lower flange of the angle bar 201 while the lower flanges of the angle bars 23, 24 abut against it and in the angles between the vertical flanges of the angle bars 23, 24 and the vertical flange of the angle bar 201, flanged brackets 27, 28 are applied so as to be secured to the front 2 and back 3 of the section by the rivets used for securing the brackets 181, 191 thereto. Two of the bolts 211 used in bolting the angle bar 201 to the square 221 are made to pass through holes in the brackets 27, 28. Further three metal plates 29, 30, 31 applied transversely on the bottom 1 of the section X* are secured thereto by means of some of the rivets used in securing the angle bars 23, 24, 25, 26.

The construction illustrated in Figs. 6, 7 and 8 so far as already described herein is stronger and more convenient in manufacture than that illustrated by Figs. 1, 2 and 3.

Figure 10:
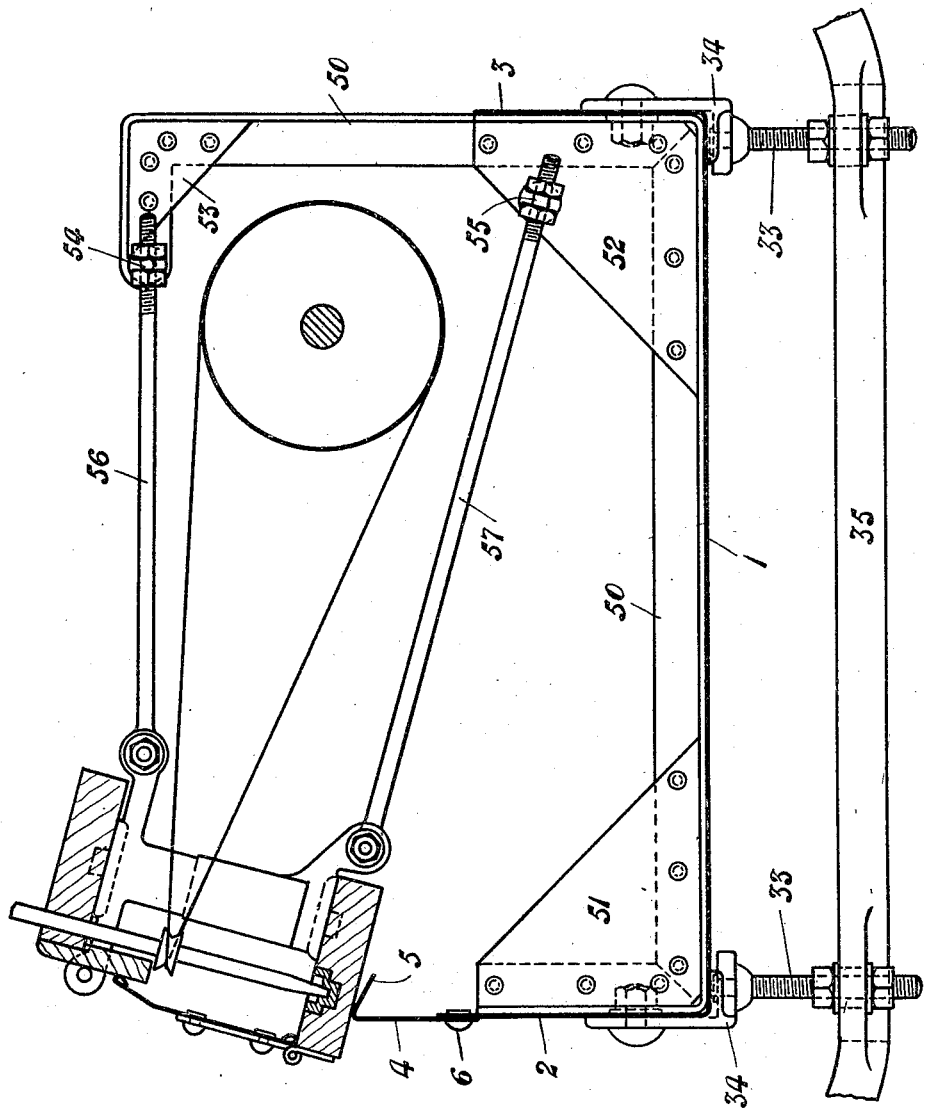
Fig. 10 is a transverse section through part of a carriage for a self acting mule illustrating the method of connecting the carriage to the carriage bearers and showing one form of mountings for the tie rods for the spindle rails or spindle boxes.

In Fig. 9 a band 32 of metal plate or sheet is applied on the outsides of two sections VIII** to be joined and made to extend for a suitable distance at each side of the meeting place and is riveted to them so that the two sections are firmly and rigidly secured together. Advantageously alternate junctions of sections are made according to the method illustrated in Fig. 9 and one or other of the methods illustrated by Figs. 1, 2 and 3 and Figs. 6, 7, and 8, so that as by the application of the band 32 to allow the interiors of the joined sections to be kept free from obstruction for a greater length than they would be if joined by the connections illustrated in Figs. 1, 2 and 3 and Figs. 6, 7 and 8. In order to illustrate the application of carriage bearers to a mule carriage constructed according to this invention Fig. 10 shows rising screws 33 riveted in brackets 34 which are bolted to the front 2 and rear 3 of a section represented. The rising screws 33, are connected to and adjusted and secured in the carriage bearers 35 in the ordinary way, there being, as usual, two rising screws 33 at the front of the carriage and one at the back for bearing brackets for the tin roller to be mounted in a carriage constructed according to this invention are mounted in the carriage in different ways in accordance with the situations in which they are required to be placed, for example at the junctions of sections or between the junctions of sections or between the junction of two sections and the connection of one of such sections to the square.

In Figs. 1, 2, 4 and 5, the upper faces of the angle bars 10 provided as aforesaid at the upper edges of the plate 9 between the sections VIII, VIII are adapted to receive a bearing bracket secured by suitable means such as bolts and a bracket 36 riveted to the angle bars 10 is provided with a screw threaded or other holes to receive or to afford bearing for a set screw or bolt with a lock nut or other suitable device for use in adjusting the bearing bracket lengthwise of the angle bars 10.

In Figs. 1 and 4, parts of the vertical flanges of the angle bars 10 are shown as cut away so that a gap open above is formed in each to be opposed to that in the other and a gap longitudinally coterminous with those in the angle bars and extending downwards for a suitable distance is formed in the plate 9 so as to form a slot 37 for the passage of the shanks of the bolts for securing the tin roller bearing bracket on the angle bars 10 and space 38 below the angle bars 10, 10 for access to the nuts on such bolts.

In Figs. 1, 2, 11, 13, and 15, a plate 39 applicable at the junctions of sections or between the junctions of sections and the connection of a section to a square of a self acting mule, is provided to extend across a section from the front to the back wall and bent to bear against and to be riveted to the front and back walls 2, 3.

The plate 39 is formed with flanges 40 at the ends to bear against and to be riveted to the front and back walls 2, 3 of the section in which it is to be applied and also is shown as formed with a flange 41 to be riveted to the bottom 1 of the section but angle bars to extend from the front to the back wall of the section and to bear on the upper surface of the bottom may be riveted to the lower edge of the plate 39 at opposite sides and eventually to the bottom 1 of the section. Angle bars 101 to extend between the front and back walls 2, 3, of the section are riveted to the upper edge of the plate 39 at opposite sides, and much like those already described in reference to bearing brackets at the junctions of sections afford bearing for and have the tin roller bearing bracket 42, secured to them by bolts 43 and nuts or set screws or other means and have riveted to them a bracket 36 with a screw threaded or other hole to receive or afford bearing for a set screw or bolt 44 with a lock nut or other device for use in adjusting the bearing bracket on the angle bars. The parts of the vertical flanges of the angle bars 101 are cut away so as to have coterminous gaps open above and a gap 38 coterminous with them is formed in the plate 39 and made to extend a suitable distance below the angle bars 101 so that a slot 37 for the passage of the shanks of the bolts 43 and space for access to the nuts thereon are formed. The plate 39 with the angle bars 45 101 applied to it being riveted to the section in which it is to be used, serves to stiffen it in the centre or other part at which the plate 39 is applied.

In Figs. 6, 7, 12, 14, and 16, channel bars 45 with parts of the flanges made to furnish at the ends, ears 46 at right angles to the bars or in other positions convenient for attachment of the bars 45 are furnished with slots 47 for the passage of bolts 431 for securing the tin roller brackets 421 and with hand holes 48 for access to the nuts on the bolts 431 but holes and communicating slots for the passage respectively of the heads and shanks of bolts may be provided so that bolts may be inserted if the holes are accessible from only one side in use and if both faces are accessible in use simple holes may serve. The channel bars are applied with flanges downwards, transversely within the sections and are riveted or bolted at their ends to the front and rear of the sections to which they are applied. The channel bars 45 are shown as also formed with horizontal flanges 49 along their lower edges which are riveted to the bottoms of the sections in which the channel bars 45 are applied. Each channel bar 45 is made to bear one of the bearing brackets 42 for the tin roller to extend along the carriage, bolts or studs 431 for securing the bearing bracket to the channel bars being passed through the slot in it. Brackets 361 secured to the channel bars by means of rivets or by means of bolts passed through holes either with communicating slots or simple holes as aforesaid or other means may be provided to afford screw threaded holes or other appropriate bearing for screws 441 with lock nuts for adjusting and fixing the adjustment of the bearing brackets 42 lengthwise of the channel bars. The channel bars 45 provided in this way for carrying bearing brackets 42 may be attached at any convenient place on the sections either at the junctions or elsewhere and serve to stiffen the sections to which they are applied. Channel bars on which the bearing brackets may be mounted as aforesaid may also be attached in other ways on the sections to which they are applied.

The mountings for the attachment of the tie rods used for adjusting and fixing the positions of the spindle rails or spindle boxes similarly to the tin roller bearing brackets are mounted in the carriage in different ways appropriate to their situation. Fig. 10 shows a mounting for attachment of tie rods which is applicable for any of the pairs of tie rods excepting the one or two or more pairs, as the case may be, nearest the headstock of the self acting mule. The mounting shown in Fig. 10, is formed of an angle bar 50 bent, after the necessary excision of parts to allow bending, into a shape presenting a length to lie in and to be riveted to the bottom 1 of the section of a mule carriage, an upwardly directed arm at the front to bear and to be riveted to the front wall 2 of the section, an upwardly directed part to bear and to be riveted against and to extend above the rear wall 3 of the section and having a forwardly directed arm at its upper end. Plates 51, 52, 53 or pieces of steel plate are riveted in the angles of the bent angle bar 50 to stiffen it. Holes are formed in the forwardly directed arm of the rear portion of the mounting and in the plate 52 applied in the angle below it, to receive the pivots 54, 55 or other means for holding the tie rods 56, 57 for the spindle rails or spindle boxes and the upper flange of the forwardly directed arm is provided with a hole for a bolt by which a longitudinal rail for the support of top and back covers may be secured to it. The mounting is riveted to the section in which it is applied.

Fig. 15 shows one of the mountings for the attachment of the tie rods of the spindle rail or spindle box at the part nearest the headstock. The mounting shown in Fig. 15 is formed of an angle bar 58 bent, with the necessary excision of parts to allow bending, into a shape presenting a horizontal arm to bear on and to be riveted to the flange of the upper rear angle bar 14 within the section of the carriage, an upwardly extending part to bear against and to be riveted to and to extend upwards beyond the rear wall 2 of the section and at the upper end of the upwardly extending part a forwardly extending arm. Pieces of steel 59, 60 are riveted in the angles of the bent bar 58 to stiffen it. The two forwardly directed arms are formed with holes to receive the pivots 541, 551 or other means for holding the tie rods for the spindle rails or spindle boxes and the upper forwardly directed arm is provided in its top flange with a hole for a bolt by which a longitudinal rail 61 for the support of top and back covers may be secured to it. The mounting 58 is riveted to the section to which it is applied.

Figures 19, 20:
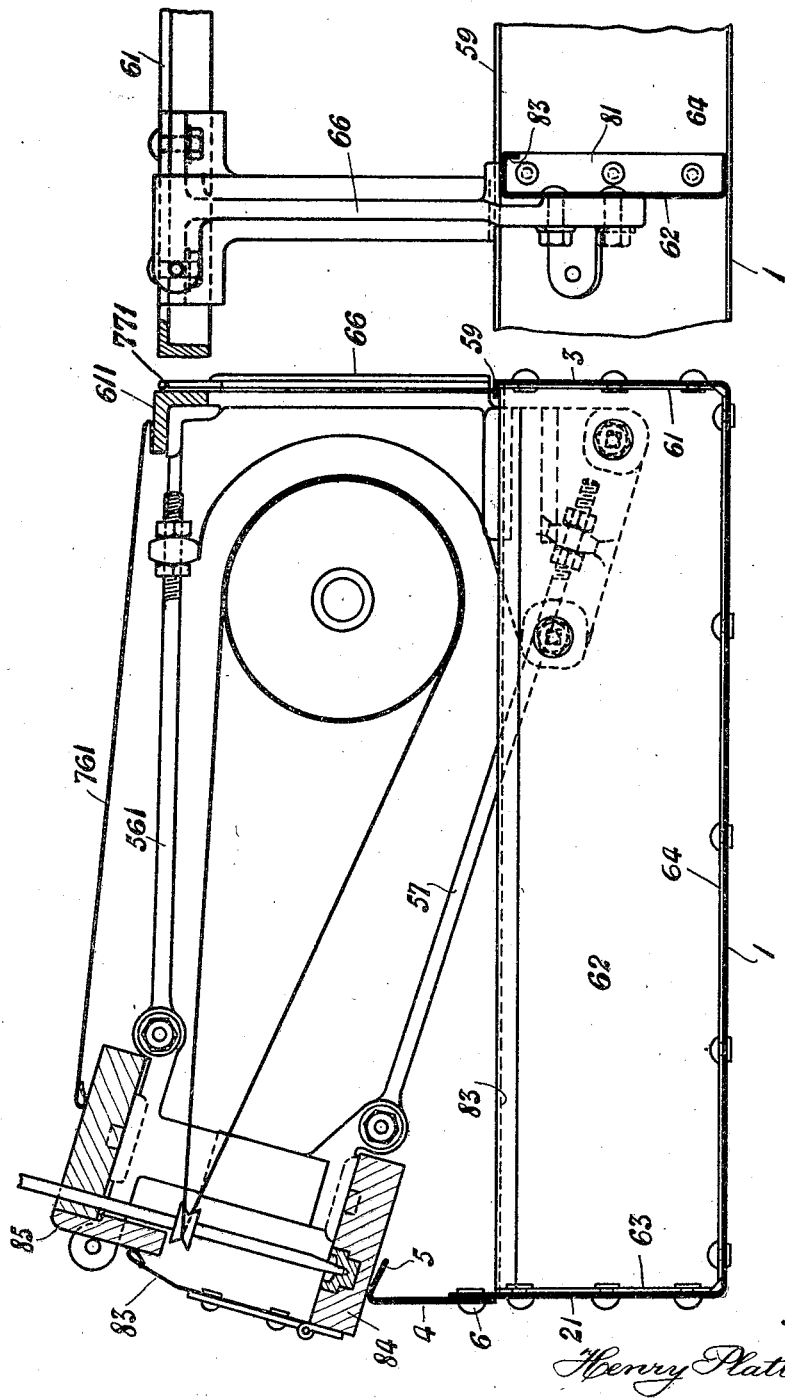

In Figs. 19, 20, 21, and 22 show a channel bar 62 formed with ears 63 at its ends riveted to the front 2 and back 3 of a section a lower plane flange 64 riveted to the bottom 1 of a section and with an upper flange 65 with a downwardly directed flange at its edge are riveted in position by means of the ears 63 and lower flanges 64 and brackets 66 generally similar in their upper parts to those used for providing attachment for the upper tie rods on mule carriages, and also attachment for the longitudinal rail 611 are bolted on the angle bars or channel bars 62 to provide either attachment for the upper and lower tie rods 561, 571 or to provide attachment for only the upper tie rods 561 in which case the lower tie rods 571 are attached to the angle bars or channel bars 62. In Figs. 19 and 20 which show the bracket 66 as resting on as well as bolted to the channel bar 62 the tie rods 561, 571 are shown as passed through and free to swivel in ears on the bracket 66. Instead of the channel bars 62, angle bars made to extend from front to back of sections formed as hereinbefore described may be riveted in position by means of one flange.

Other means for attaching the tie rods to the brackets and angle bars or channel bars may be employed.

Fig. 16 shows brackets 68 provided with ears to bear against the bottom 1 and back 3 of a section and secured thereto by bolts and provided according to this invention with ears for the passage of the tie rods 562, and 572 for the spindle rails or spindle boxes, and also to have bolted to them the longitudinal rail 612.

The end plate 69 for closing the end of the carriage remote from the headstock in the construction illustrated in Figs. 17 and 18 is formed of a plate of steel of appropriate shape which may be formed with one opening or more to lighten it, and if with such an opening or openings, two being shown is provided with one panel or plate of sheet metal or more to cover or to fill it or them, and is stiffened around its lower part by an angle bar 70 bent, after the necessary excision of parts to allow bending, to bear and to be riveted to the shell or trough of the section of the carriage remote from the headstock. The end plate 69 is also provided near the rear upper corner of the inner face with a bracket 71, riveted to it, formed of steel plate shaped and bent so as to furnish an approximately triangular part to bear and to be riveted against the end plate 69 and flanges at its rear and upper sides, that at the upper side serving for the attachment of a longitudinal rail 61.

In any case in which it is more convenient that the back stops against which the carriage arrives at the end of its inward run, shall be placed opposite to parts of the carriage other than the junction of sections or the place where there are mountings for the tie rods or the bearing brackets of the tin roller of the spindle rails or boxes there are provided opposite to the one or each place where a back stop is to be placed, a strut within the trough of a section of the carriage and a reinforcing plate 72 similar to that shown in Fig. 15 on the rear exterior of the trough, to enable the trough better to sustain the shock of contact with the back stop. The strut is formed of a channel bar similar to the channel bar 45 with ears 46 at the ends and flanges 49 at the sides shown in Figs. 14 and 16 but without the slot 47 and openings 48 and is mounted to bear and riveted upon the bottom 1 of the trough and riveted at its ends to the front 2 and back 3. The reinforcing plate 72 used with the strut is formed of size convenient to afford a surface to meet the back stop with which it is used and marginal parts to receive rivets which serve to secure the reinforcing plate 72 and one end of the strut to the trough of the section on and in which they are applied. A reinforcing plate 72 for use with a back stop may be applied also if desirable in any case where there is a section coupling or an attachment for the upper and lower tie rods of the spindle rails or spindle boxes, or a mounting for a tin roller bearing bracket.

Fig. 15 shows a reinforcing plate 72 applied with a support 39 for a tin roller bearing bracket. The faller relieving motions and middle drawing out tightening arrangements which are of ordinary construction and therefore not shown may be supported by means of brackets much like those ordinarily used on wooden carriages of self acting mules for carrying the "faller relieving motions" and "middle drawing out tightening arrangements" and riveted to the upturned front 2 and rear 3 of the sections of a mule carriage and to angle bars provided on the bottom 1 to receive them or serving also for other purposes.

The faller shaft 74 and counterfaller shaft 75 which may be of ordinary construction may be carried in uprights riveted or otherwise secured in convenient positions to the troughs of sections of the carriage or to parts applied thereon. Figs. 17 and 18 show an upright 73 bolted to the end plate 69.

Longitudinal rails 61, (611 and 612) secured to the several mountings for the tie rods of the spindle rails, or spindle boxes the square of the headstock and the end plates of the carriage as the case may be are provided for the support or attachment of the rear edges of top covers 76—761 and the upper edges of rear covers 77—771.

The longitudinal rails 61, 611, 612 are made of angle bars connected together to form continuous rails.

The tops covers 76—761 are formed of steel sheet in convenient lengths and of widths sufficient to enable them to overlap to the extent necessary the upper spindle rail or spindle box at the front and the longitudinal supporting rails 61, 611, 612 at the rear and may have either plain or beaded edges and may be provided with pegs 78 as shown in Fig. 15 to be engaged in holes in the longitudinal rails 61 or folded edges 79 providing grooves to embrace the edges of the longitudinal rails 61 as shown in Fig. 16 held in position in any other way convenient.

The rear covers 77, 771 may be formed of wood or formed of steel sheet in convenient lengths and with holes and communicating slots enabling them to be applied to and suspended from headed studs 80 in the longitudinal rails 61 as shown in Fig. 15 and may be made to overlap or to pass behind the rear walls of the troughs of the sections of the carriage or may be provided with strips 81 of sheet metal or brackets riveted to them in order to provide means for engaging the sheets with the rear walls of the troughs.

Rear covers of steel sheet may be used and be mounted in grooves 82 as shown in Fig. 16 in the brackets providing attachments for the upper tie rods of the spindle rails or spindle boxes or in channelled parts of or on the square and end plates of the carriage much in the manner practised in the construction of wood mule carriages or wood carriages may be used.

Front covers 83 may be made of sheet metal in convenient lengths in any way convenient and may be made to overlap or to enter or to be engaged in any convenient way with the fronts of the spindle rails or spindle boxes. Figs. 15 and 16 show front covers 83 hinged to the lower spindle rails or boxes 84 and made to rest against the upper spindle rails or boxes 85.

The spindle rails or spindle boxes 84, 85 are advantageously formed of longitudinal wood rails connected by metal or other brackets but spindle rails or spindle boxes wholly of metal may be used.

Steel plates and sheets have hereinbefore been mentioned but plates and sheets of iron or other metal may be used for the purpose of this invention.

This invention may be applied to a self acting mule with a carriage at both sides or at only one side of the headstock, the construction applied in any case in which there is a carriage at only one side of the headstock being equivalent to that applied at the part of the carriage at one side of the headstock of a self acting mule having the carriage at both sides of the headstock.

What I do claim as my invention and desire to secure by Letters Patent is:—

1. A self acting mule carriage comprising sections each formed of a metal plate bent into channel shape with a bottom and front and back walls, characterized by a section to be joined to the square having within the cavity of the bent plate or sheet forming the bottom and front and back walls of the section, longitudinal angle bars extending along and riveted to the front and back walls and bent angle bars each extending from near the centre to the corners at the front and back at one end and towards the corners at the front and back at the other end and riveted to the bottom of the section and a channel bar in the centre riveted to such bent angle bars.

2. A self acting mule carriage comprising sections each formed of a metal plate bent into channel shape with a bottom and front and back walls characterized by a section to be joined to the square having within the cavity of the bent plate or sheet forming the bottom and front and back walls of the section longitudinal angle bars extending along the junctions of the front and back walls with the bottom and riveted respectively to the front and bottom and back wall and bottom and bent angle bars extending on the bottom from near the centre to near the front and back corners at one end and towards the corners at the other end and riveted to the bottom.

3. A self acting mule carriage comprising sections each formed of a metal plate bent into channel shape with a bottom and front and back walls, characterized by meeting sections and a plate which is applied on the outsides of said sections and is made to extend for a suitable distance at each side of the meeting place and is riveted to such sections.

4. A self acting mule carriage comprising sections each formed of a metal plate bent into channel shape with a bottom and front and back walls, characterized by a metal plate which is applied transversely to the length of such carriage and secured therein and has riveted along its upper edge at opposite sides angle bars adapted for receiving a tin roller bearing bracket and extending between the front and back walls of the carriage and is furnished with a slot and gap prepared in the angle bars and the plate and a block secured on the angle bars and an adjusting device in connection with such block for adjusting such bracket lengthwise of the angle bars.

5. A self acting mule carriage comprising sections each formed of a metal plate bent into channel shape with a bottom and front and back walls characterized by meeting sections in the carriage, means for connecting meeting sections, a metal plate which is applied between the meeting faces of meeting sections and secured by the connecting means connecting such sections and has riveted along the edges at opposite sides angle bars adapted for receiving a tin roller bearing bracket and extending between the front and back walls of the carriage and is furnished with a slot and gap prepared in the angle bars and the plate and a block secured on the angle bars, and an adjusting device in connection with such block for adjusting such bracket lengthwise of the angle bars.

6. A self acting mule carriage comprising sections each formed of a metal plate bent into channel shape with a bottom and front and back walls, characterized by a plate which extends across a section from the front to the back and has flanges at its front and rear ends to bear against and to be riveted to the front and back walls of the sections and has riveted along its upper edge at opposite sides angle bars adapted to have attached thereto a tin roller bearing bracket and is furnished with a slot and gap prepared in the angle bars and plate, a block secured on the angle bars and an adjusting device in connection with such block for adjusting that bearing bracket lengthwise of the angle bars.

7. A self acting mule carriage comprising sections each formed of a metal plate bent into channel shape with a bottom and front and back walls, characterized by a plate which extends across a section from the front to the back and has flanges at its ends and bottom to bear against and to be riveted to the front and back walls and bottom of the section and has riveted along its upper edge at opposite sides angle bars adapted to have attached thereto a tin roller bearing bracket and is furnished with a slot and gap prepared in the angle bars and plate, a block secured on the angle bars and an adjusting device in connection with such block for adjusting that bearing bracket lengthwise of the angle bars.

8. A self acting mule carriage comprising sections each formed of a metal plate bent into channel shape with a bottom and front and back walls, characterized by a plate which extends across a section from the front to the back and has flanges at its ends to bear against and to be riveted to the front and back walls of the section and has angle bars riveted to its lower edge on each side to bear against and to be riveted to the bottom of said section and also has riveted along its upper edge at opposite sides angle bars adapted to have attached thereto a tin roller bearing bracket, a block secured on the angle bars on the upper edge of the plate and an adjusting device in connection with such block for adjusting that bearing bracket lengthwise of the angle bars.

9. A self acting mule carriage comprising sections each formed of a metal plate bent into channel shape with a bottom and front and back walls, characterized by a channel bar having parts of the flanges made to furnish ears for attachment in the required positions in the carriage and adapted to have attached to it a tin roller bearing bracket, a block secured on the channel bar and an adjusting device in connection with such block for adjusting that bearing bracket lengthwise of the channel bar.

10. A self acting mule carriage comprising sections each formed of a metal plate bent into channel shape with a bottom and front and back walls, characterized by a channel bar having parts of the flanges made to furnish ears for attachment in the required positions in the carriage and adapted to have attached to it a tin roller bearing bracket, a block secured on the channel bar and an adjusting device in connection with such block for adjusting the bearing bracket lengthwise of the channel bar.

11. A self acting mule carriage according to claim 9, characterized by the channel bar for carrying a bearing bracket having horizontal flanges along its lower edges to receive rivets for attachment.

12. A self acting mule carriage according to claim 9, characterized by the channel bar for carrying a bearing bracket having a hand hole.

13. A self acting mule carriage according to claim 9, characterized by the channel bar for carrying a bearing bracket having hand holes.

14. A self acting mule carriage comprising sections each formed of a metal plate bent into channel shape with a bottom and front and back walls, characterized by an angle bar to provide attachment for tie rods for spindle rails or spindle boxes which is bent to present a length to lie in and to be riveted to the bottom of a section of the carriage, an upwardly directed arm at the front to be riveted to the front wall of the section, an upwardly directed part to bear and to be riveted against and to extend above the rear wall and having a forwardly directed arm at its upper end and has stiffening pieces riveted in the angles where it is bent.

15. A self acting mule carriage comprising sections each formed of a metal plate bent into channel shape with a bottom and front and back walls, characterized by a section to be joined to the square, an upper rear angle bar in such section, an angle bar presenting a flange to provide attachment for tie rods of spindle rails or spindle boxes which is bent to present a horizontal arm to bear on and to be riveted to the flange of the said upper rear angle bar, an upwardly extending part to bear against and to be riveted to and to extend upwards beyond the rear wall of the section and, at the end of the upwardly extending part, a forwardly extending arm and has stiffening pieces riveted in the angles where it is bent.

16. A self acting mule carriage comprising sections each formed of a metal plate bent into channel shape with a bottom and front and back walls, characterized by a channel bar which is provided with ears at its ends and flanges above and below and is riveted by the ears and lower flange to a section and has attached to it a bracket providing attachment for upper and lower tie rods for spindle rails or spindle boxes.

17. A self acting mule carriage comprising sections each formed of a metal plate bent into channel shape with a bottom and front and back walls, characterized by a channel bar which is provided with ears at its ends and flanges above and below and is riveted by the ears and lower flange to a section and provides attachment for a lower tie rod for a spindle rail or spindle box and has attached to it a bracket providing attachment for an upper tie rod for a spindle rail or spindle box.

18. A self acting mule carriage comprising sections each formed of a metal plate bent into channel shape with a bottom and front and back walls, characterized by a channel bar which is provided with ears at the ends and flanges above and below and a downwardly directed flange at the edge of the upper flange and has resting on it and bolted to it a bracket providing attachment for upper and lower tie rods for spindle rails or spindle boxes.

19. A self acting mule carriage comprising sections each formed of a metal plate bent into channel shape with a bottom and front and back walls, characterized by a bracket shaped to provide ears to bear against the bottom and rear wall of a section and to be bolted thereto and providing attachment for upper and lower tie rods for spindle rails or spindle boxes.

20. A self acting mule carriage comprising sections each formed of a metal plate bent into channel shape with a bottom and front and back walls, characterized by an end plate of metal plate stiffened around the lower parts by an angle bar bent and applied to bear against and to be riveted to the shell or trough of the carriage at the end remote from the headstock.

21. A self acting mule carriage comprising sections each formed of a metal plate bent into channel shape with a bottom and front and back walls, characterized by an end plate provided with a bracket of metal plate riveted to it shaped and bent to form a part to be riveted against the end plate and flanges at its rear and upper sides, that at the upper side to serve for the attachment of a longitudinal rail, a longitudinal rail attached to the upper side of said bracket.

22. A self acting mule carriage comprising sections each formed of a metal plate bent into channel shape with a bottom and front and back walls, characterized by a reinforcing plate riveted upon the rear of a section for presentation to a back stop and a back stop presented to such carriage.

23. A self acting mule carriage comprising sections each formed of a metal plate bent into channel shape with a bottom and front and back walls, characterized by a channel bar with parts of the flanges bent to form ears extending transversely from the ends and riveted by the ears to front and back walls of the carriage at a part for presentation to a back stop and a back stop presented to such carriage.

24. A self acting mule carriage comprising sections each formed of a metal plate bent into channel shape with a bottom and front and back walls, characterized by a channel bar with parts of the flanges bent to form ears extending transversely from the ends and having parts of the flanges forming lateral flanges and riveted by the ears at the end and the lateral flanges to the front and back and bottom of the carriage at a part for presentation to a back stop and a back stop presented to such carriage.

25. A self acting mule carriage comprising sections each formed of a metal plate bent into channel shape with a bottom and front and back walls, characterized by a longitudinal rail made of sections of metal plate secured together into a continuous rail as means for supporting the rear edges of top covers and the upper edges of rear covers.

26. A self acting mule carriage comprising sections each formed of a metal plate bent into channel shape with a bottom and front and back walls, characterized by a longitudinal rail made of sections of metal plate riveted together into a continuous rail as means for supporting the rear edges of top covers and the upper edges of rear covers.

27. A self acting mule carriage comprising sections each formed of a metal plate bent into channel shape with a bottom and front and back walls, characterized by an upper spindle rail or spindle box at the front and a longitudinal supporting rail at the rear and top covers formed of metal sheet in convenient lengths and of width sufficient to enable them to overlap to the extent necessary, the upper spindle rail or spindle box at the front and the longitudinal supporting rail at the rear and having pegs to be engaged in the longitudinal rail supporting them.

28. A self acting mule carriage comprising sections each formed of a metal plate bent into channel shape with a bottom and front and back walls, characterized by rear covers having means for engaging the rear walls of sections of the carriage.

In testimony, that I claim the foregoing as my invention, I have signed my name in presence of two witnesses, this eighth day of February 1921.

HENRY PLATT HALL.

Witnesses:
HOWARD CHEETHAM,
RUTH M. WILSON.